US005608788A

United States Patent [19]

Demlow et al.

[11] Patent Number: 5,608,788
[45] Date of Patent: Mar. 4, 1997

[54] INFORMATION DISPLAY PROVIDED TO CALLING PARTY

[75] Inventors: William W. Demlow, Woodridge; David L. Hurewitz; Francis J. Pope, III, both of Naperville, all of Ill.

[73] Assignee: Lucent Technologies Inc., Murray Hill, N.J.

[21] Appl. No.: 524,968

[22] Filed: Sep. 8, 1995

Related U.S. Application Data

[63] Continuation of Ser. No. 300,099, Sep. 1, 1994, abandoned, which is a continuation of Ser. No. 953,437, Sep. 29, 1992, abandoned.

[51] Int. Cl.⁶ .......................... H04M 15/00; H04M 15/06
[52] U.S. Cl. .......................... 379/142; 379/111; 379/115; 379/118; 379/120; 379/127; 379/133; 379/136
[58] Field of Search .................................. 379/91, 93, 96, 379/111–115, 118, 120, 127, 133, 136, 142, 201, 265, 266, 216, 354, 376, 396

[56] References Cited

U.S. PATENT DOCUMENTS

| | | | |
|---|---|---|---|
| 3,920,908 | 11/1975 | Kraus | 379/91 |
| 4,166,929 | 9/1979 | Sheinbein | 379/209 |
| 4,277,649 | 7/1981 | Sheinbein | 379/142 |
| 4,510,349 | 4/1985 | Segre-Amar | 379/96 |
| 4,582,956 | 4/1986 | Doughty | 179/2 A |
| 4,800,583 | 1/1989 | Theis | 379/142 |
| 4,811,382 | 3/1989 | Sleevi | 379/202 |
| 4,850,007 | 7/1989 | Marino et al. | 379/67 |
| 4,918,322 | 4/1990 | Winter | 379/96 |
| 4,922,490 | 5/1990 | Blakley | 379/142 |
| 4,922,519 | 5/1990 | Daudelin | 379/266 |
| 4,922,523 | 5/1990 | Hashimoto | 379/96 |
| 4,926,471 | 5/1990 | Ikeda | 379/354 |
| 4,933,968 | 6/1990 | Iggulden | 379/216 |
| 4,943,994 | 7/1990 | Ohtsuka et al. | 379/53 |
| 4,943,995 | 7/1990 | Daudelin et al. | 379/67 |
| 4,975,896 | 12/1990 | D'Agosto | 379/96 |
| 5,003,584 | 3/1991 | Benyacar et al. | 379/201 |
| 5,023,868 | 7/1991 | Davidson | 379/93 |
| 5,029,196 | 7/1991 | Morganstein | 379/142 |
| 5,043,983 | 8/1991 | Dorst et al. | 379/96 |
| 5,046,183 | 9/1991 | Dorst et al. | 370/110.1 |
| 5,054,055 | 10/1991 | Hanle et al. | 379/96 |
| 5,056,134 | 10/1991 | Bauer et al. | 379/246 |
| 5,119,415 | 6/1992 | Aoyama | 379/207 |
| 5,131,024 | 7/1992 | Pugh et al. | 379/67 |
| 5,146,348 | 9/1992 | Kaneyama | 379/96 |
| 5,163,087 | 11/1992 | Kaplan | 379/142 |
| 5,184,345 | 2/1993 | Sahni | 379/93 |
| 5,210,789 | 5/1993 | Jeffus | 379/127 |

(List continued on next page.)

FOREIGN PATENT DOCUMENTS

| | | | |
|---|---|---|---|
| 0344672 | 12/1989 | European Pat. Off. | H04M 11/08 |
| 3705554 | 9/1988 | Germany | H04M 1/00 |
| 4151957 | 5/1992 | Japan | H04M 11/00 |
| 219513 | 4/1988 | United Kingdom | H04M 1/00 |
| 8500487 | 1/1985 | WIPO | H04M 3/42 |

OTHER PUBLICATIONS

C. B. Rubinstein et al., "Corporate Networking Applications", *AT&T Technical Journal*, vol. 70, No. 5, Oct. 1991, pp. 27–35.

B. Turman et al., "Bell Operating Company Packet Interfaces Between Networks and Subnets", *Computer Network & ISDN Systems*,, Jan. '89, No. 3, Amsterdam, pp. 187–196.

*Primary Examiner*—Wellington Chin
*Assistant Examiner*—Vijay Shankar
*Attorney, Agent, or Firm*—Werner Ulrich; Dennis J. Williamson

[57] ABSTRACT

This invention relates to methods of providing information for display at a calling party telecommunications station or at an idle station. Two signaling arrangements are described, the D-channel of an Integrated Services Digital Network (ISDN) channel, and an in-band frequency shift key signal. The information that is displayed is related to the called party (such as information identifying that party), the carrier of the conversation, or represents general information (an emergency announcement).

32 Claims, 6 Drawing Sheets

U.S. PATENT DOCUMENTS

| | | | |
|---|---|---|---|
| 5,233,648 | 8/1993 | Nakamura | 379/93 |
| 5,253,288 | 10/1993 | Frey et al. | 379/265 |
| 5,282,243 | 1/1994 | Dabbaghi | 379/201 |
| 5,283,818 | 2/1994 | Klausner | 379/142 |
| 5,299,261 | 3/1994 | Bogart et al. | 379/354 |
| 5,321,740 | 6/1994 | Gregorek et al. | 379/67 |
| 5,428,670 | 6/1995 | Gregorek et al. | 379/67 |
| 5,448,625 | 9/1995 | Lederman | 379/67 |

FIG. 1

FIG. 2
OFF-HOOK MESSAGES PRIOR TO DIALING

FIG. 6
ICLID STATE DIAGRAM

INFORMATION DISPLAY PROVIDED TO CALLING PARTY

RELATED APPLICATION

The present application is a continuation of U.S. application Ser. No. 08/300,099, now abandoned, filed Sep. 1, 1994, which is a continuation of U.S. application Ser. No. 07/953,437, now abandoned, filed Sep. 29, 1992.

TECHNICAL FIELD

This invention relates to a method and apparatus for displaying information to a telecommunications station.

PROBLEM

A service which has become more and more popular in recent years is one for indicating to a called customer the identification of the caller. With conventional analog telephones, this service, called incoming calling line identification (ICLD), is provided through the use of an auxiliary display which receives information identifying the caller between the first two rings and uses the received information to control a display for displaying the number of the caller. For telephones provided with integrated services digital network (ISDN) features, the display of an incoming call can be provided totally independently of the ringing signal since both ringing and the incoming number display are supplied as a result of data messages received in a separate control channel at the telephone. In addition, for outgoing calls, on ISDN telephones only, the called number and the length of the call are displayed under the control of the subscriber station, and an indication of an outgoing call to an external party, as contrasted with a call within a private branch exchange (PBX) or Centex, is provided from the switch. A problem of the prior art is that while ICLD does provide information to help the called customer on incoming calls, neither ICLD nor other ISDN features provide significant information from the telecommunications network to help the calling customer on outgoing calls, or while a customer is idle or talking.

SOLUTION

In accordance with the principles of this invention, in a telecommunications network having a switching system for serving a calling customer, an advance is made over the prior art by providing the calling customer with data supplied from or via a connected central office prior to, or during, the time that the caller is dialing and/or while the called customer is being alerted (i.e., while the called telephone is ringing), and, for appropriately equipped stations, after the call has been established. Depending on the circumstances, the information being supplied to the calling customer may come from a data base shared by a plurality of central office switching systems, or may come from a data base of the central office switching system connected to the customer. The data base may be accessed using a signaling network such as the CCS7 network which is currently employed to help establish calls and for conveying the calling number to the called customer for ICLID. The information is provided in response to a signal, such as a supervisory signal or a series of signals such as those for conveying a dialed number.

In accordance with one specific embodiment of the invention, the device that is used to display information to the caller is an ICLID device, heretofore used only for displaying the incoming number. The calling customer receives a frequency shift keyed (FSK) signal for controlling an ICLID display device, either prior to receiving audible tone, or between bursts of audible tone when the called party is being alerted (the audible tone may interfere with FSK signaling), or when the telephone station is idle or in the talking state.

In accordance with another feature of the invention, for telecommunications stations equipped for out-of-band signaling, a display unit is used to display signals transmitted over the out-of-band signaling channel. In one specific embodiment, an ISDN display unit is used to display information received over a D-channel of an ISDN signal connecting an ISDN telephone to a switch, whether or not the ISDN station is calling or being called or is idle.

In accordance with either of these embodiments, many types of information can be displayed on the calling telephone. Examples are the following. (1) The name of the called customer. (This may be blanked for cases in which an unlisted telephone is being called.) (2) A motto, slogan, advertising, or cost message from the called customer. (3) Information to give the calling party additional options, such as automatic callback or an invitation to leave a voice message. (4) Information from the central office reporting conditions such as overload. The source of such information may be other central office switching systems. (5) A service identification mark from the central office switching system and/or an inter-exchange carrier.

In accordance with another feature of this invention, messages are displayed on telephones such as an ISDN telephone which can receive on-hook data, or on an ICLID device adapted to receive non-ringing interval messages. The message might, for example, state "Overload to Florida" if the circuits to that state were overloaded, for example, because of a hurricane. Alternatively, such messages can be displayed after a customer goes off-hook on either an ISDN station or an analog station equipped with an ICLID device.

DETAILED DESCRIPTION

Figure 1:
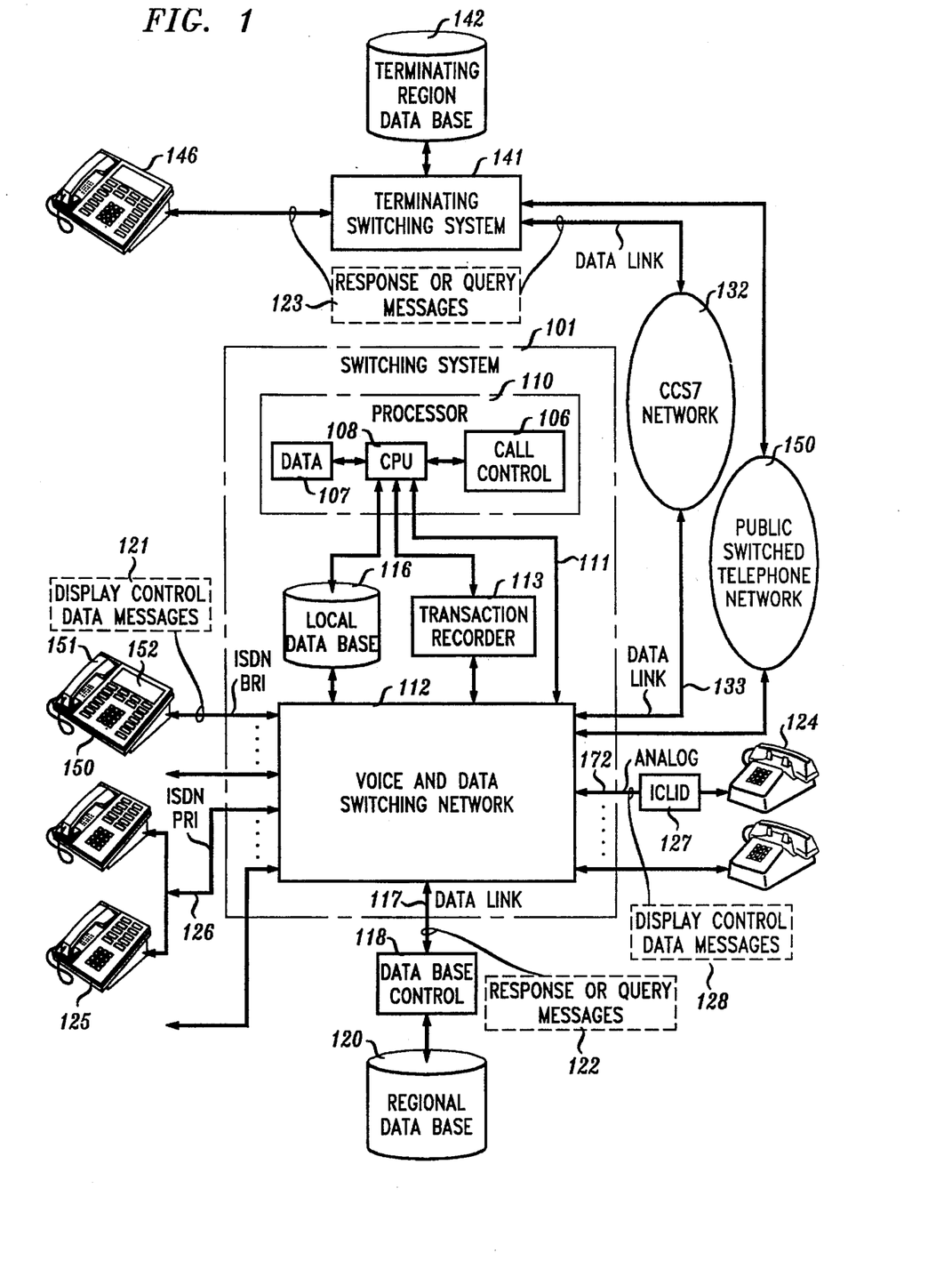
FIG. 1 is a block diagram of a telecommunication network for processing customer information in accordance with the methods of FIGS. 2–5.

FIG. 1 is an architectural block diagram illustrating the operation of the invention. The switching system (switch) 101 is a 5ESS® Switch, extensively described in *AT&T Technical Journal*, Vol. 64, No. 6, part 2, pp. 1305–1564, July/August 1985, and manufactured by AT&T, which has capabilities for switching both voice and data, as described in Beckner et al., U.S. Pat. No. 4,592,048. This switch is adapted, for example, to handle integrated services digital network (ISDN) telephone stations such as telephone station 150. The ISDN telephone station set 150, comprises a handset 151 and display 152. This station set is equipped with an CCITT ISDN Basic Rate Interface (BRI), as described in *CCITT Red Book Fascicle III.5 Series 1 Recommendation* and has the capability of handling standard Q.931 interface, as described in *CCITT Red Book Fascicle VI.9 Recommendation Q.931*. This switch is equipped to deal with station sets served via the basic rate interface (BRI) 162, or as telephone station 125 shows, those station sets served via the primary rate interface (PRI) 126. The switching system also has the capabilities for dealing with ordinary analog telephones such as telephone station 124 equipped, in this case, with an incoming calling line identification (ICLID) device 127 via an analog line 172. Further, the switching system can support a data link like 117 to serve peripheral control devices like data base control 118 with a regional data base 120. Also, switching system 101 can support data link 133 to access other switching systems via the CCS7 network 132 which interfaces switching system 141 serving station set 146 and regional data base 142. Switching systems 101 and 141 are interconnected via the public switched telephone network (PSTN) 150 which is considered to include local exchange and inter-exchange networks.

The switch 101 comprises a processor 110 for controlling the switch. The processor 110, in turn, comprises a central processing unit 108, a stored call control 106 program for controlling the operations of the central processing unit, and call data 107. The switch also comprises a local data base system 116, storing data such as: (1) customer lines connected to the system, such as the Q.931 equipped customer line 162, (2) interconnecting networks 132, (3) data links, such as data link 133 connected to the system, and (4) data about the data base control 118 connected to the system via data link 117. CPU 108 controls a transaction recorder 113 such as a magnetic tape unit which records billing information associated with services offered in accordance with applicant's invention. CPU 108 also accesses a local data base system 116 for supplying data for display at telephone stations connected to switching system 101 or for supplying data in response to requests received from CCS7 network 132 over data link 133. The switch also comprises a voice and data switching network 112 which can be used for transmitting data among processor 110 and data base control 118, and for transmitting voice and data among data links coming into the system, such as data link 133 to CCS7 Network 132, and customer lines such as customer line 162. The CCS7 Network 132 which may include one or more switching systems is used for accessing the called station 146 from switch 101. Regional data base 120 is connected to the data base control 118 via data link 117. Voice and data switching network 112 is connected to control unit 110 via a control connection 111.

The change required in the switching system to implement the present invention is the addition of a program in the processor 110 of the switch for executing the tasks described in the flow charts of FIGS. 2–5. It is to be understood that depending on circumstances, the information being supplied to the calling customer may come from the local data base 116 or from a data base shared by a plurality of central office switching systems, like the regional data base system 120. The data base control 118 and regional data base 120 are used for obtaining data about the calling or called terminal and/or called station set when this data is either requested by the local data base system 116 or initiated by the data base control 118 itself.

In this specific embodiment of the present invention, a calling party requests service from the ISDN station set 150 by lifting the handset 151, which sends a Q.931 SETUP message over the BRI line 162 to the switching system 101. This service request is detected by the voice and data switching network 112 and relayed via control connection 111 to call control 106 in processor 110. Call control 106 then sends calling party identification and line status query message 122 to the data base control 118 via the data link 117. The data base control 118 queries the regional data base 120 over the data link 117 and finds the appropriate data message 122 which is sent to the voice and data switching network via data link 117 for delivery to call control 106 via data link 111. Call control 106 places the data message in the Display Field of the appropriate Q.931 message sent to the calling party in response to the service request. The Q.931 protocol limits the maximum length of the Display Field information element to 44 octets. Other data such as that related to the called customer is similarly sent by a Q.931 message after the caller has finished dialing.

If the originating analog station 124 requests service, the data message is sent, after the completion of dialing (to avoid interferences with dialing tone signals) to ICLID device 127 for display. Alternatively, this data can be sent prior to returning dial tone. Similarly, data obtained in essentially the same way described above for an ISDN station originated call, can be returned to the ICLID device after completion of dialing and before audible ring is returned to the caller, or between bursts of audible tone. Because the ICLID device is connected to an analog line, requiring in-band signaling, it is desirable to avoid conflicts or interferences between the frequency shift keyed signal (1200 and 2200 Hz) and the dial tone signals, or audible tone signals.

FIG. 1 also illustrates a number of the types of data messages that are sent for implementing this invention. Data message 121 contains display control information for controlling a display on ISDN station set 150. Similar messages (128) are sent to the ICLID device 126 associated with the analog telephone station 124. Data messages 122 and 123 are query messages to request information from the data base system 120 in the case of data message 122 or from data base system 142 or terminating switching system 141 in the case of data message 123. These query data messages include the calling number, line status, and the called number, the called number being used to identify the response that should be sent back to callers of that number; messages 122 and 123 are also response messages, comprising data obtained in response to a query. Messages 128 and 121 are response messages comprising data obtained elsewhere, and are used for controlling a display.

FIGS. 2–5 are flow diagrams of the method of one embodiment of the present invention. These figures depict the operation of the information display service arrangement, comprising the calling party station set 150, the switching system 101 and the regional data base control 118. Calls that are treated in accordance with the principles of this invention are information display calls. Other calls are given treatment by "normal call processing" signifying treatment in accordance with the normal practices for calls. The actions that differ for the case of analog telephone 124 and ICLID device 127 are discussed separately.

Figure 2:
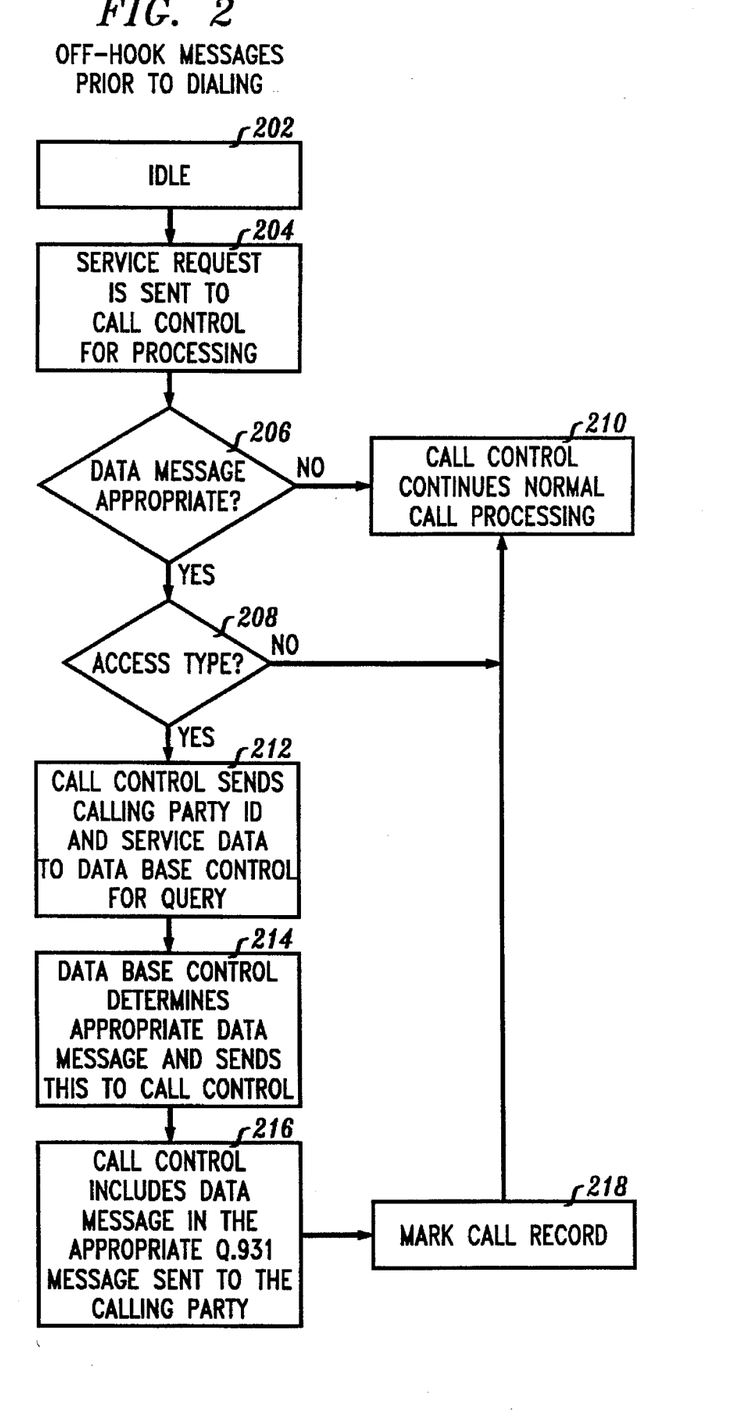
FIGS. 2–5 are flow diagrams of various methods of processing customer data and called party data calls in accordance with the invention.

FIG. 2 describes the ISDN display prior to dialing and starts at the point where the station set is idle (action block 202). When a calling party requests service (goes off-hook) a SETUP message arrives at the switching system which passes it on to call control for processing (action block 204). If the information display treatment is appropriate (test 206), it checks the access type (test 208) for proper ISDN station set with display. If either test fails (test 206 or 208), the call is given normal call processing treatment (action block 210). If both tests pass (test 206 and 208) call control sends customer identification and service requirements information to data base control(action block 212). Data base control 118 (FIG. 1) determines the appropriate information data message and delivers this message to call control 106 (FIG. 1) (action block 214). Call control includes this data message in the Display Field information element of the appropriate Q.931 confirmation message sent to the calling party via the ISDN D-channel (action block 216), marks the call record (action block 218), and returns to normal call processing (action block 210).

Examples of messages received prior to dialing are local carrier or other logos or advertising, and network status messages, such as congestion in a part of the network.

Figure 3:
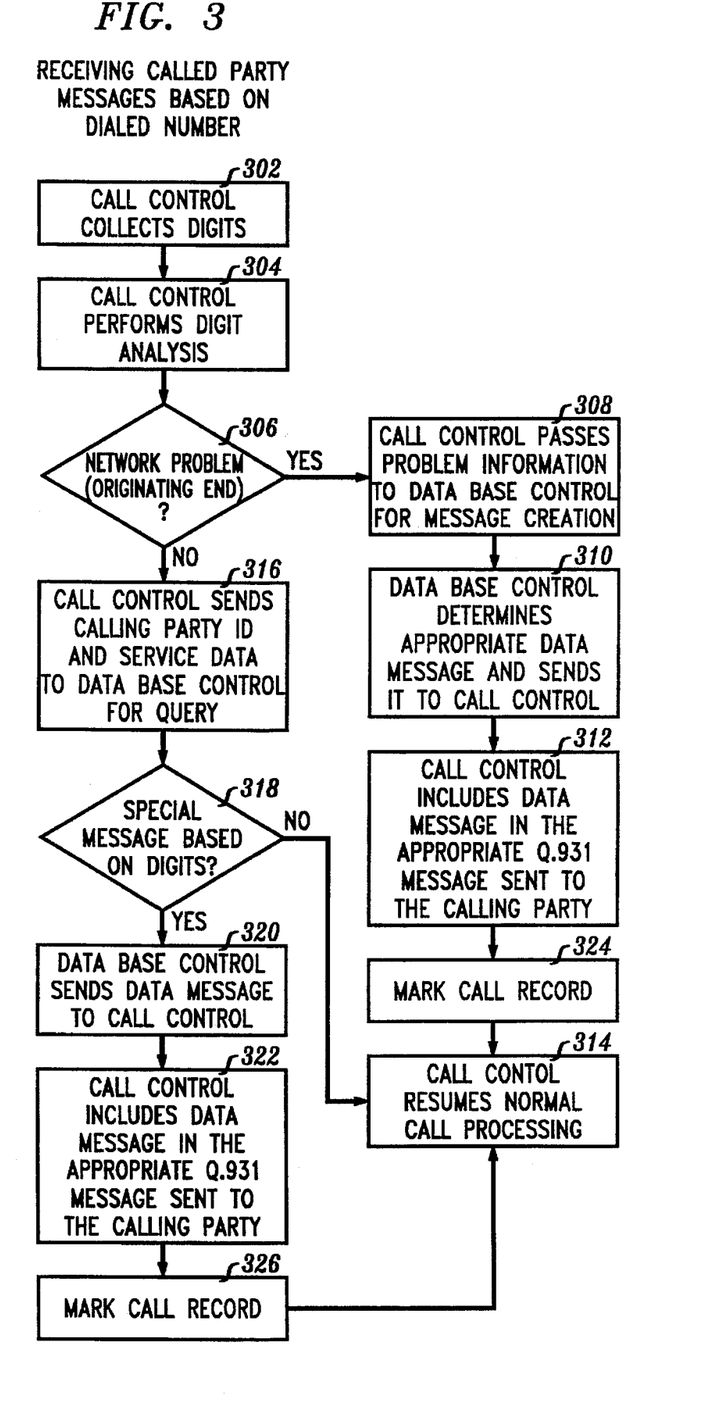

FIG. 3 describes the ISDN information display after dialing and starts with call control collecting address digits from a calling party (action block 302). Call control performs digit analysis (action block 304) and checks for originating end network problems (test 306). If a problem is found (test 306), call control passes this information to data base control 118 (FIG. 1) for processing (action block 308). Data base control processes the information and queries the regional data base for the appropriate message and sends this data message to call control (action block 310). Call control 106 includes this data message in the Display Field information element of the appropriate Q.931 message sent to the calling party (action block 312), marks the call record (action block 324), and returns to normal call processing (action block 314). On the other hand, if no originating end network problem is detected (test 306), call control 106 sends calling and called address information along with access type information to data base control for processing (action block 316). Based on the received information, if data base control determines that no special messages are appropriate for the call (test 318) it informs call control which returns to normal call processing (action block 314). Otherwise, data base control delivers the appropriate message to call control (action block 320). Call control includes this data message in the Display Field information element of the appropriate Q.931 message sent to the calling party via the ISDN D-channel (action block 322), marks the call record (action block 326), and returns to normal call processing (action block 314).

This embodiment is useful to display messages relating to the called party and may be provided by the called party or by one of the system data bases. Examples are the name of the party corresponding to the dialed number; the cost of the call for example, where the cost is determined by the called party (such as in a 900 type call); waiting time for a queued call; advertising by the destination customer; and special instructions such as dial codes to obtain a special service (such as automatic callback, or a special service, for example, from an attendant).

This embodiment is particularly well suited for outgoing calls to toll-free 800 numbers or other numbers which require translation in a regional or national routing data base as part of the routing function. In these cases the inquiry to the data base would simply elicit dual responses—the routing message for the switching system and the response message for the caller's information display. Many 800 numbers are advertised using acronyms to assist the caller in remembering the digits to dial. If the response message in such a case were the name of the company receiving the call, such information could verify to the caller that the correct party has been dialed. This would permit the caller to cancel the call attempt if it is being directed to the wrong party, thereby preventing an unwanted connection. This embodiment can also be used to display the telecommunications charge (initial or incremental) for a call, supplied by the local exchange carrier or an inter-exchange carrier.

Figure 4:
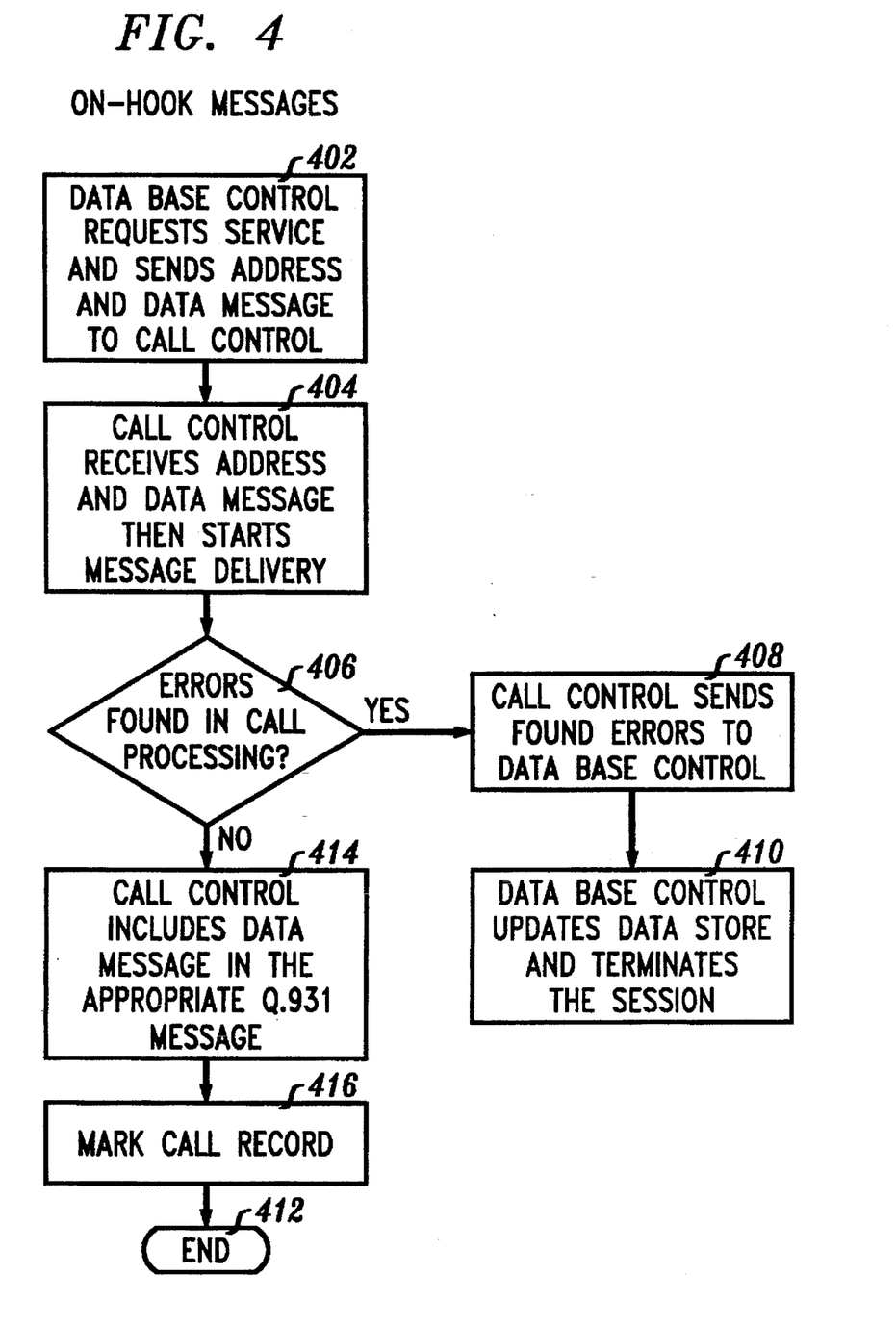

FIG. 4 describes the ISDN information display for on-hook messages and starts with the data base control 118 (FIG. 1) initiating a request to send a message by sending address information and a data message to call control (action block 402). The data message is for display of variable data such as a plurality of characters, and is generated without receipt of a request from the station. The terms "off-hook" and "on-hook" as used herein refer generically to the active or inactive supervisory states of any telecommunications terminal. Examples of such messages are emergency messages such as public announcements; the cost of a previous call; system status alerting messages, such as local, regional or national network congestion messages; and a voice, facsimile, or e-mail message waiting notice. If several messages are queued for a caller, these can be transmitted sequentially prior to providing dial tone. Call control receives the data message and address information and starts message delivery (action block 404). If no address information errors are detected by call control (test 406), call control places the data message into the Display Field information element of the appropriate Q.931 messages sent out via the ISDN D-channel (action block 414) and marks the call record (action block 416), and ends the session (action block 412). If call address errors are detected by call processing (test 406), call control sends this information to data base control (action block 408). Data base control then updates the regional data base system and terminates the session (action block 410). Such messages can also be sent to a station when the station is off-hook during a call.

Figure 5:
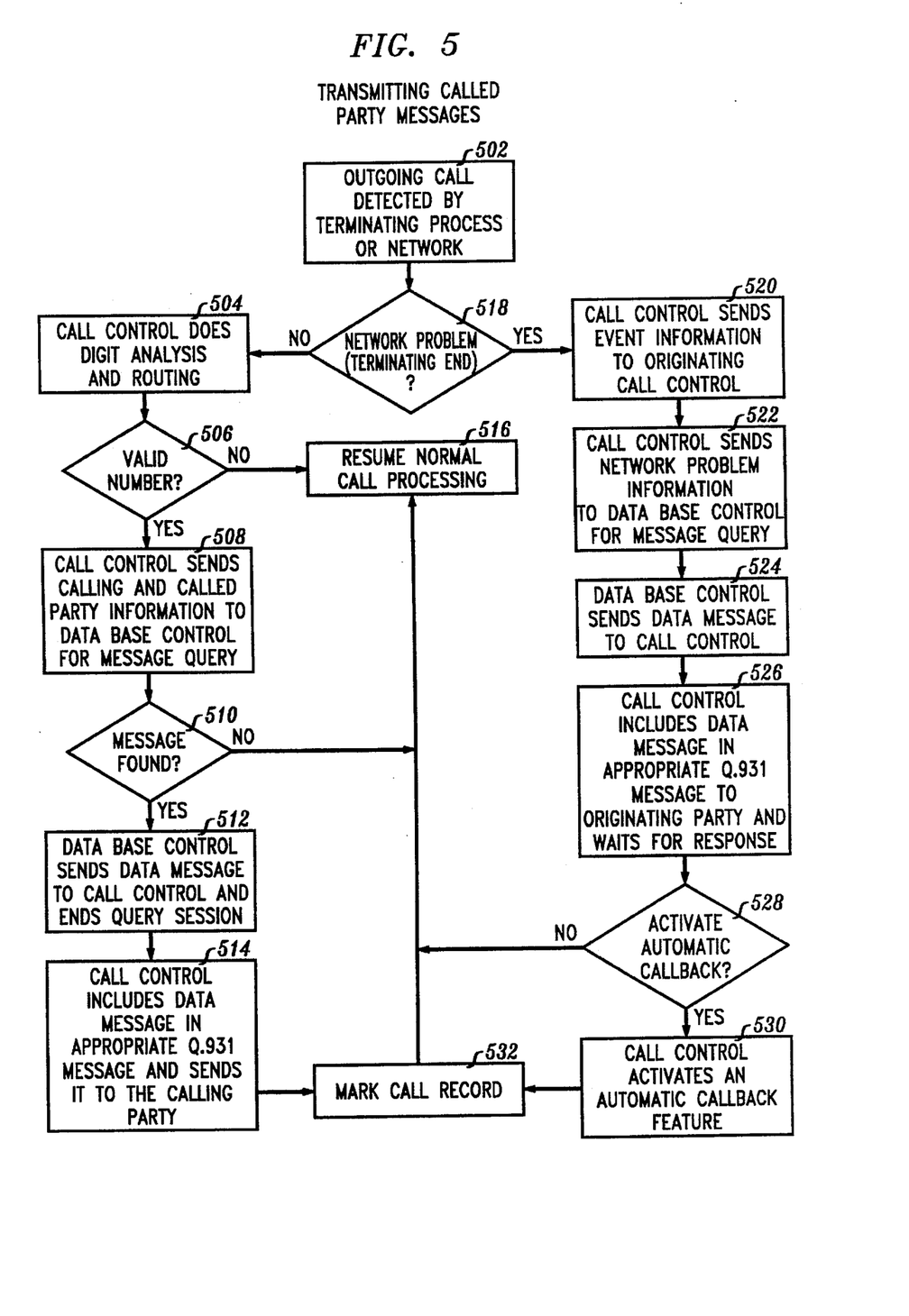

FIG. 5 illustrates ISDN information display control initiated from the terminating end of the call. The terminating process or network detects an incoming call (action block 502). If no terminating end network problem is found (test 518), call control concludes digit analysis and routing (action block 504). If call processing detects an invalid number (test 506), it returns to normal call processing (action block 516). On the other hand if the number is valid (test 506), call processing sends the calling and called number information together with the access type information to data base control as a data message query (action block 508). If a message is appropriate (test 510), data base control sends this data message to call control (action block 512). Call control includes this data message in the Display Field information element of the appropriate Q.931 message sent to the calling party via the ISDN D-channel (action block 514), marks the call record (action block 532), and returns to normal call processing (action block 516). If a network problem were detected (test 518) this information would be returned to the call control serving the calling party (action block 520). Call control sends this information to data base control as a data message query (action block 522). Data base control sends the appropriate data message to call control (action block 524). Call control places the data message into the Display Field information element of the appropriate Q.931 messages sent out via the ISDN D-channel to the calling party and waits for response (action block 526). If the calling party does not wish to have the switching system automatically activate automatic callback (test 528), call control returns to normal call processing. If on the other hand the calling user selects automatic callback (test 528), call control will activate automatic callback (action block 530), mark the call record (action block 532), and return to normal call processing. Automatic callback is just one example of a feature triggered remotely by the calling party. Other examples of called party messages are called party advertising messages, slogans or logo; waiting times if the call is queried; calling party instructions or options; messages to induce a calling party not to terminate the call but to seek additional information (jokes, games, prizes, etc.).

Figure 6:
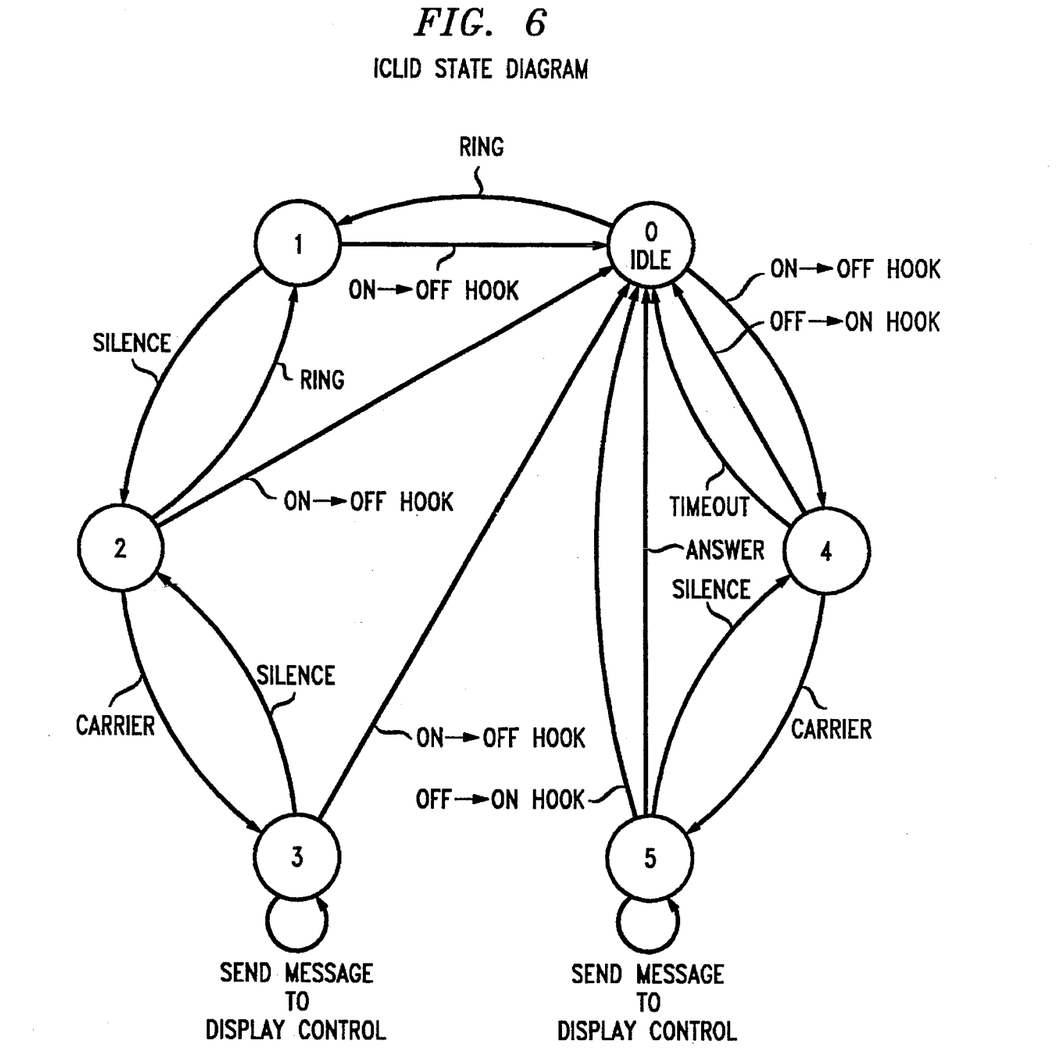
FIG. 6 is a state diagram of an ICLID device for practicing the invention.

FIG. 6 is a state diagram of an ICLID device 127. A prior art circuit is described in C. R. Doughty, U.S. Pat. No. 4,582,956. The prior art circuit is controlled according to the first four states of the state diagram of FIG. 6. Initially, the connected telephone station is on-hook and the circuit is idle (state 0), and, when ringing is detected it goes into state 1. When subsequent silence is detected, the circuit goes into state 2. From state 2, if a frequency shift key (FSK) carrier signal is detected, the ICLID circuit goes into state 3 and when in state 3, FSK signals are detected and passed to a display control system. If carrier is no longer detected, the ICLID circuit reverts to state 2. If in any one of the states 1, 2, or 3, a transition from on-hook to off-hook is detected, the ICLID circuit goes back to the idle state 0.

In order to accomplish the objectives of this invention, three more states (states 4–6) are added to the ICLID control. When the ICLID circuit is in the idle state (state 0) and a transition from on-hook to off-hook is detected, the ICLID circuit goes into new state 4. While in state 4, if a FSK carrier is detected, the ICLID circuit goes into new state 5, and, in new state 5, detects FSK messages which are then transmitted to the display control. While in state 5, the calling station earphone is disabled so that the caller cannot hear the FSK signals. If absence of carrier is detected the ICLID circuit goes back into state 4. While in either state 4 or state 5, if the telephone instrument goes from off-hook to on-hook, the ICLID circuit goes back to the idle state 0. In addition, if while in state 5 or state 4, an answer signal is recognized, the ICLID circuit goes back to the idle state 0. (At this time, the message can be retained until the subscriber goes on-hook; while in state 0, a transition from off-hook to on-hook is ignored in this embodiment). The answer signal is recognized at switching system 101 in order to allow charging for the call to begin. The answer signal to the ICLID device while in state 5 can be a specific brief FSK message from either switch 101 or terminating switching system 141. The transition from state 4 to state 0 may also be accomplished by a simple timeout. In addition, if FSK carrier is detected while on-hook or off-hook (in state 0, idle) the ICLID circuit goes to state 6, in which it can receive data messages. If the FSK carrier disappears, the ICLID circuit goes back to idle (state 0).

A prior art circuit used to transmit data from a switch to the ICLID device described in C. R. Doughty, U.S. Pat. No. 4,551,581. This prior art circuit can be modified in a straightforward manner to transmit data in the absence of transmitting a ringing signal, or to transmit data between bursts of audible tone or during other caller off-hook or on-hook states or to disconnect audible tone while transmitting a data message. Data messages to be transmitted before the caller dials are transmitted before dial tone is applied.

Action blocks 216, 312, 322, 414, 514, and 526 are modified if the connected station is an analog station with an ICLID device to simply request that data be transmitted, using FSK data transmission, without regard to the Q.931 protocol. The smaller size of the ICLID display and the lower speed of FSK data transmission must be taken into account in formulating messages to ICLID devices. Test 528 is responsive to keyed tone signals since the analog telephone cannot send ISDN messages.

The Analog Display Services Interface (ADSI) described in TA-1273 issued by Bellcore permits FSK signaling to be provided off-hook; this system mutes the station receiver while FSK carrier signals are transmitted. Such a system cannot be used for signaling while the caller is dialing, since at least one of the dial tone multifrequency (DTMF) signals interfere with the FSK signal; however, after dialing is complete, as detected by the switching system, signals may be sent to the calling station. Any other signaling arrangement for providing data while the caller is off-hook can also be used; some of these arrangements use a lower power level to transmit digital information so that the caller's ear is not subjected to an excessively loud signal. Data over voice signaling arrangements, well known in the prior art, can provide a convenient method of signaling to an analog station at essentially any time (other than during ringing).

Note that if only analog telephones are served by a particular switch, the invention can be practiced for those telephones equipped with ICLID devices even if the serving central office switching system cannot serve ISDN stations.

The "display" discussed herein may be visual static (characters or graphical), visual dynamic, audible, or tactile (for use by disabled users), and may be in one or more media (e.g., audible and visual). The display can be controlled by a processor with memory in the terminal, which can then display a stored or generated result, selected and possibly modified by the received data.

It is to be understood that the above-described procedures are merely illustrative of the principles of the present invention and many variations may be devised by those skilled in the art without departing from the spirit and scope of the invention. For example, instead of delivering the information for visual display, the process could alternatively relay the information as a voice message, as a video message or as any other kind of out-of-band signal message.

We claim:

1. A telecommunications network for providing data to a plurality of station sets, comprising:

a switching system;

a plurality of station sets served by the switching system, said switching system being responsive to public telephone numbers sent to said switching system from said station sets;

means for storing routing information for the public telephone numbers and a plurality of associated data messages where each of said associated data messages is associated with the routing information for one of said public telephone numbers;

means, operative in response to a request from said switching system and based on a specific one of said public telephone numbers from one of said plurality of station sets, for selecting routing information and the associated data message for the specific telephone number from said means for storing;

means for sending said associated data message to said one of said plurality of station sets;

means for displaying said associated data message to a party at said one of said plurality of stations sets; and means for initiating said means for selecting the associated data message before a connection is established between said one of said plurality of station sets and a second station set.

2. The telecommunications network according to claim 1, wherein said means for storing includes a data base in the switching system.

3. The telecommunications network according to claim 1, wherein said means for storing includes a data base accessible by a plurality of switching systems.

4. The telecommunications network according to claim 1, wherein the associated data message includes the name of a party identified by the public telephone number.

5. The telecommunications network according to claim 1, wherein the associated data message includes advertising from a party identified by the public telephone number.

6. The telecommunications network according to claim 1, wherein said means for displaying includes an incoming line identification (ICLID) device connected to said at least one of said plurality of station sets.

7. The telecommunications network according to claim 6, wherein said means for sending transmits a frequency shift key (FSK) data message.

8. The telecommunications network according to claim 1, wherein the associated data message includes instructions to obtain special service.

9. The telecommunications network according to claim 1, wherein the means for sending further includes a Q.931 message sent out via an ISDN D-channel.

10. The telecommunications network according to claim 1, wherein the means for displaying includes a visual display.

11. The telecommunications network according to claim 10, wherein the visual display is video.

12. The telecommunications network according to claim 10, wherein the visual display is digital.

13. The telecommunications network according to claim 10, wherein said visual display is static.

14. The telecommunications network according to claim 10, wherein said visual display is dynamic.

15. The telecommunications network according to claim 1, wherein the means for displaying includes a tactile display.

16. The telecommunications network according to claim 1, wherein the means for displaying includes an audio output.

17. The network according to claim 1, wherein said public telephone numbers are tollfree (800) numbers and said routing information includes the number translation for the tollfree numbers.

18. In a telecommunications network including a switching system and a plurality of station sets served by the switching system, a method for providing a particular one of a plurality of data messages stored in a data base to said plurality of station sets comprising the steps of:

selecting a particular data message from said data base under the control of the switching system;

sending said particular data message to one of said plurality of station sets;

initiating the sending of the particular data message while said one of said plurality of station sets is on hook; and displaying said particular data message at said one of said plurality of station sets while said one of said plurality of station sets is on hook.

19. The method according to claim 18, wherein said particular data message includes public announcements.

20. The method of claim 18, wherein said particular data message includes information relating to the status of the network.

21. A telecommunications network for providing data to a plurality of station sets, comprising:

a switching system;

a station set served by the switching system;

means for storing a plurality of data messages;

means, under the control of said switching system, for selecting a particular data message from said means for storing;

means for sending said particular data message to said station set;

means for displaying said particular data message to a party at said station set; and means for initiating said means for selecting the particular data message while said station set is on hook.

22. A telecommunications network for providing data to a plurality of station sets, comprising:

a switching system;

a first station set served by the switching system;

means for storing a plurality of data messages, said means for storing being accessible by said switching system;

means, operative in response to a request from said switching system, for automatically selecting a particular data message from said means for storing;

means for automatically sending said particular data message to said first station set;

means for displaying said particular data message to a party at said first station set; and means for initiating said means for selecting the particular data message after a connection is established between said first station set and a second station set.

23. The telecommunications network according to claim 22, wherein said particular data message identifies the local service carrier.

24. The telecommunications network according to claim 22, wherein said particular data message includes a service identification mark for a local service carrier.

25. The telecommunications network according to claim 22, wherein said particular data message includes information relating to the status of the network.

26. The telecommunications network according to claim 22, wherein the particular data message includes the cost of the call.

27. The telecommunications network according to claim 22, wherein the particular data message includes the waiting time for a queued call.

28. The telecommunications network according to claim 22, wherein the particular data message includes the cost of a previous call.

29. A telecommunications network for providing data to a plurality of station sets, comprising:

a plurality of station sets;

a switching system serving said plurality of station sets including means for receiving a public telephone number from a first station set, said public telephone number used by said switching system for routing a call to a second station set;

means for determining if problems exist in the network related to the routing of the call to said second station set;

means for storing a plurality of data messages, said data messages relating to said problems;

means, operative in response to said means for determining, for automatically selecting a particular data message from said means for storing;

means for automatically sending said particular data message to at least said first station set;

means for displaying said particular data message to a party at said first station set; and means for initiating said means for selecting the particular data message before a connection is established between said first station set and said second station set.

30. In a telecommunications network including a switching system and a plurality of station sets served by the switching system, said switching system being responsive to public telephone numbers sent to said switching system from said station sets, a method for providing a particular one of a plurality of data messages stored in a data base to said station sets comprising the steps of:

storing routing information for the public telephone numbers and a plurality of associated data messages where each of said associated data messages is associated with the routing information for one of said public telephone numbers;

selecting routing information and the associated data message from said data base in response to a request from the switching system and based on a specific one of said public telephone numbers from one of said plurality of station sets;

sending said associated data message to said one of said plurality of said station sets;

initiating the sending of the associated data message before call processing establishes a connection between said one of said plurality of station sets and a second station set; and     displaying said associated data message at said one of said plurality of station sets before said connection is established.

31. In a telecommunications network including a switching system and a plurality of station sets served by the switching system, a method for providing a particular one of a plurality of data messages stored in a data base accessible to said switching system to said plurality of station sets comprising the steps of:

selecting a particular data message from said data base under the control of, and in response to, a request from the switching system;

automatically sending said particular data message to one of said plurality of station sets;

initiating the sending of the particular data message after call processing establishes a connection between said one of said plurality of station sets and a second one of said plurality of station sets; and     displaying said particular data message at said one of said plurality of station sets after said connection is established.

32. In a telecommunications network including a switching system and a plurality of station sets served by the switching system, a method for providing a particular one of a plurality of data messages stored in a data base to said plurality of station sets comprising the steps of:

receiving a public telephone number from a first station set, said public telephone number used by the switching system for routing a call to a second station set;

determining if problems exist in the network related to the routing of the call to the second station set;

storing a plurality of data messages, said plurality of data messages relating to said problems;

selecting a particular data message from said data base under the control of the switching system in response to determining that one of said problems exists;

sending said particular data message to said first station set;

initiating the sending of the particular data message before call processing establishes a connection between said first station set and said second station set; and     displaying said particular data message at said first station set before said connection is established.

\* \* \* \* \*